United States Patent
Park et al.

(10) Patent No.: US 7,650,759 B2
(45) Date of Patent: Jan. 26, 2010

(54) APPARATUS FOR CONTROLLING REFRIGERANT LEVEL

(75) Inventors: Bong-Soo Park, Seoul (KR); Sai-Kee Oh, Seoul (KR); Chi-Woo Song, Incheon (KR); Ju-Won Kim, Gyeongsangnam-Do (KR); Baik-Young Chung, Incheon (KR); Se-Dong Chang, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 510 days.

(21) Appl. No.: 11/244,364

(22) Filed: Oct. 6, 2005

(65) Prior Publication Data
US 2006/0075763 A1   Apr. 13, 2006

(30) Foreign Application Priority Data
Oct. 7, 2004   (KR) .............. 10-2004-0080012

(51) Int. Cl.
*F25B 45/00* (2006.01)
*G01K 13/00* (2006.01)
*G01F 23/00* (2006.01)

(52) U.S. Cl. .............. 62/149; 62/129; 73/290 R; 73/295

(58) Field of Classification Search ............ 62/149, 62/129, 126, 127; 340/618; 165/11.1; 73/290 R, 73/295, 291, 292, 305
See application file for complete search history.

(56) References Cited

U.S. PATENT DOCUMENTS

| 2,106,756 | A | | 2/1938 | Obermaier |
| 3,562,546 | A | | 2/1971 | Kraemer et al. |
| 3,813,629 | A | | 5/1974 | Szeverenyi et al. |
| 5,435,145 | A | * | 7/1995 | Jaster .......................... 62/115 |
| 5,655,379 | A | | 8/1997 | Jaster et al. |

FOREIGN PATENT DOCUMENTS

WO   WO-02/079732 A1   10/2002

* cited by examiner

*Primary Examiner*—Chen-Wen Jiang
(74) *Attorney, Agent, or Firm*—Birch, Stewart, Kolasch & Birch, LLP

(57) ABSTRACT

An apparatus for controlling a refrigerant level comprises a first detecting unit installed at a lower side of the inside of a refrigerant tank, for detecting whether a refrigerant stored at a lower side of the inside of the refrigerant is a liquefied refrigerant or a gaseous refrigerant, a second detecting unit installed at an upper side of the inside of the refrigerant tank, for detecting whether a refrigerant stored at an upper side of the inside of the refrigerant tank is a liquefied refrigerant and a gaseous refrigerant, and a control unit controlling intake and discharge of the liquefied refrigerant according to a value measured by the first detecting unit and the second detecting unit.

20 Claims, 8 Drawing Sheets ably higher than the one of the liquefied refrigerant 12*a*, and is greater than that of the gaseous refrigerant 12*b*.

APPARATUS FOR CONTROLLING REFRIGERANT LEVEL

BACKGROUND OF THE INVENTION

1. Field of the Invention

The present invention relates to an apparatus for controlling a refrigerant level, and particularly, to an apparatus for controlling a refrigerant level which can control a level of a refrigerant stored in a refrigerant tank.

2. Description of the Conventional Art

FIG. 1 is a longitudinal sectional view that illustrates a refrigerant tank provided with a conventional apparatus for controlling a refrigerant level.

As shown in FIG. 1, the refrigerant tank 10 provided with a conventional apparatus for controlling a refrigerant level has a space portion 12 for storing a refrigerant in a main body 11.

An intake pipe 13 through which a liquefied refrigerant 12*a* is received is formed at an upper portion of the main body 11 of the refrigerant tank 10, and a discharge pipe 14 through which the liquefied refrigerant 12*a* is discharged is formed at a lower portion of the main body 11 of the refrigerant tank 10.

An intake valve 13*a* for the refrigerant intake into the main body 11 of the refrigerant tank 10 is installed at the intake pipe 13, and a discharge valve 14*a* for discharging a refrigerant is installed at the discharge pipe 14.

An insertion hole 11*a* is formed at an upper end of the main body 11 of the refrigerant tank 10, and a sealing member 11*b* for sealing the insertion hole 11*a* is coupled to the insertion hole 11*a*.

An apparatus for controlling a refrigerant level using a specific gravity difference between a float and a refrigerant is provided at the space portion 12 of the main body 11 of the refrigerant tank 10.

The conventional apparatus for controlling a refrigerant level includes a guide 15 installed long in a vertical direction in the main body 11 of the refrigerant tank, floats 16 and 17 respectively formed at an upper portion and a lower portion of the guide 15, and stoppers 18 and 19 respectively installed at upper and lower sides of the floats 16 and 17.

Here, the specific gravity of the float 16 and 17 is smaller than that of the liquefied refrigerant 12*a*, and is greater than that of the gaseous refrigerant 12*b*. In general, if apparatus for controlling a refrigerant level is a low pressure type in which the inside of the main body 11 of the refrigerant tank 10 is in a low pressure state, the floats 16 and 17 are formed of rubber in a spherical body, and if the device is a high pressure type in which the inside of the main body 11 of the refrigerant tank 10 is in a high pressure state, the floats 16 and 17 are formed of metal in a spherical shape. A gas is injected in the floats 16 and 17.

The stoppers 18 and 19 limit a range within which the corresponding floats 16 and 17 ascend and descend.

However, technically, it is difficult to seal, with the sealing member, the insertion groove formed at an upper end of the main body of the refrigerant tank provided with the conventional apparatus for controlling a refrigerant level. In this case, the refrigerant leaks from a gap of the sealed portion.

Also, if the height of the main body of the refrigerant tank gets higher, the height of the guide should get higher as much. Therefore, the entire structure becomes complicated, the manufacturing cost increases, and it is difficult to install the float at the guide.

Also, in case of the high pressure type float, the float itself is deformed by the pressure of the gas injected therein.

SUMMARY OF THE INVENTION

Therefore, an object of the present invention is to provide an apparatus for controlling a refrigerant level that has a simple structure and achieves a low manufacturing cost, reliability and durability.

To achieve these and other advantages and in accordance with the purpose of the present invention, as embodied and broadly described herein, there is provided an apparatus for controlling a refrigerant level comprising: a first detecting unit installed at a lower side of the inside of a refrigerant tank, for detecting whether a refrigerant stored at a lower side of the inside of the refrigerant tank is a liquefied refrigerant or a gaseous refrigerant; a second detecting unit installed at an upper side of the inside of the refrigerant tank, for detecting whether a refrigerant stored at an upper side of the inside of the refrigerant tank is a liquefied refrigerant or a gaseous refrigerant, and a control unit controlling inflow of a liquefied refrigerant and a gaseous refrigerant from an intake pipe installed at an upper side of the refrigerant tank and controlling discharge of the liquefied refrigerant from a discharge pipe installed at a lower side of the refrigerant tank upon determining a level of a liquefied refrigerant according to values measured by the first detecting unit and the second detecting unit.

The first detecting unit comprises: a first cell installed at a lower side of the refrigerant tank and having therein a space portion, a first cell inner-wall temperature sensor installed at an inner wall of the first cell, for measuring a temperature of the first cell, a first heat generation portion installed at the space portion of the first cell at an distance from the first cell inner-wall temperature sensor, for transferring heat only to the first cell inner-wall temperature sensor, and a first refrigerant temperature sensor installed at the space portion of the first cell, for detecting a temperature of a refrigerant stored at a lower side of the inside of the refrigerant tank.

The first heat generation portion includes a first heat generation body installed at the space portion of the first cell and a first power connected to the first heat generation body.

Preferably, a heat blocking layer of a heat insulation material or a filling material for decreasing heat transfer from the first heat generation body to the first refrigerant temperature sensor is installed between the first heat generation body and the first refrigerant temperature sensor.

The second detecting unit comprises a second cell installed at a lower side of the refrigerant tank and having therein a space portion, a second cell inner-wall temperature sensor installed at an inner wall of the second cell, for measuring a temperature of the second cell, a second heat generation portion installed at the space portion of the second cell at an distance from the second cell inner wall temperature sensor, for transferring heat only to the second cell inner-wall temperature sensor, and a second refrigerant temperature sensor installed at the space portion of the second cell, for detecting a temperature of a refrigerant stored at a lower side of the inside of the refrigerant tank.

The second heat generation portion comprises a second heat generation body installed at the space portion of the second cell, and a second power connected to the second heat generation body.

Preferably, a heat blocking layer of a heat insulation material or a filling material for decreasing heat transfer from the second heat generation body to the second refrigerant temperature sensor is installed between the second heat generation body and the second refrigerant temperature sensor.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
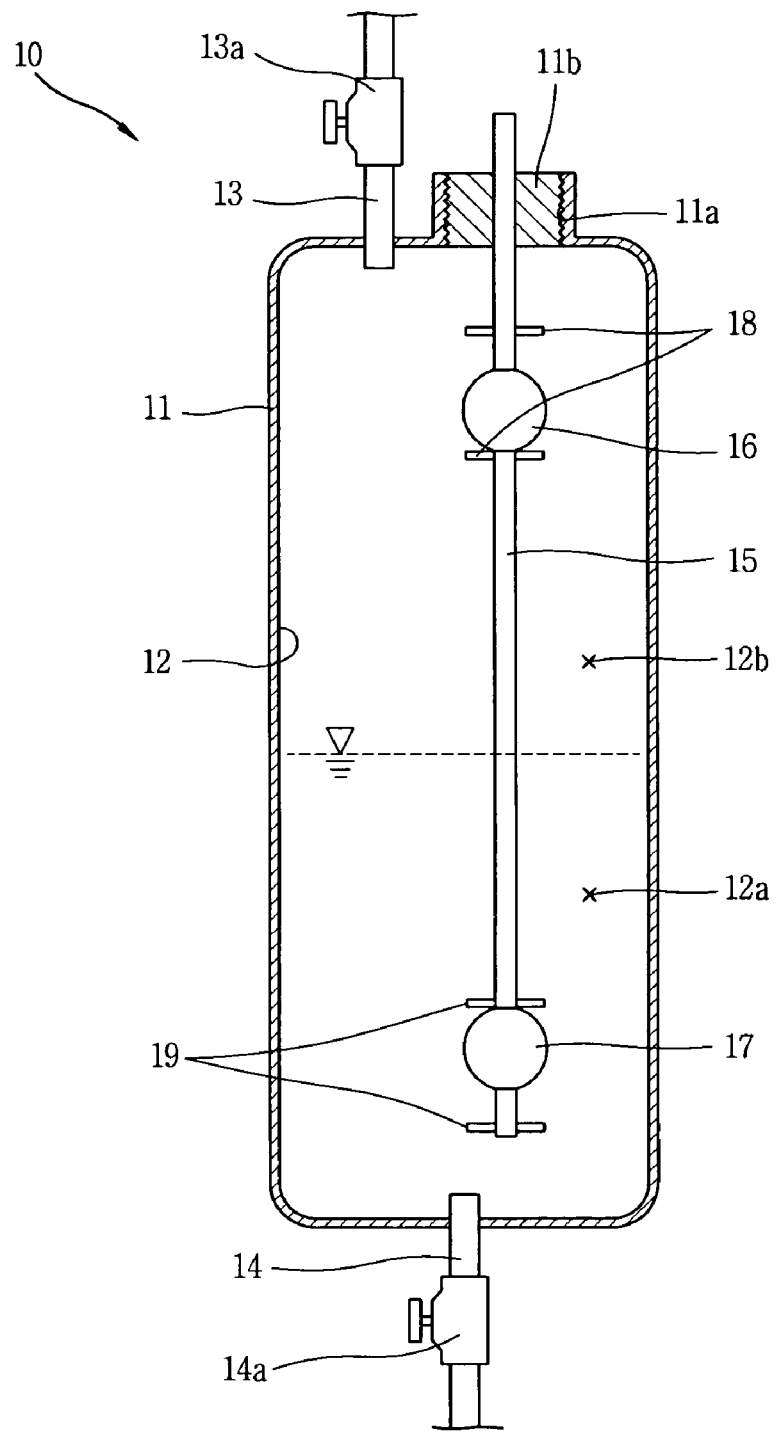
FIG. 1 is a sectional view that illustrates a conventional apparatus for controlling a refrigerant level.
Figure 2:
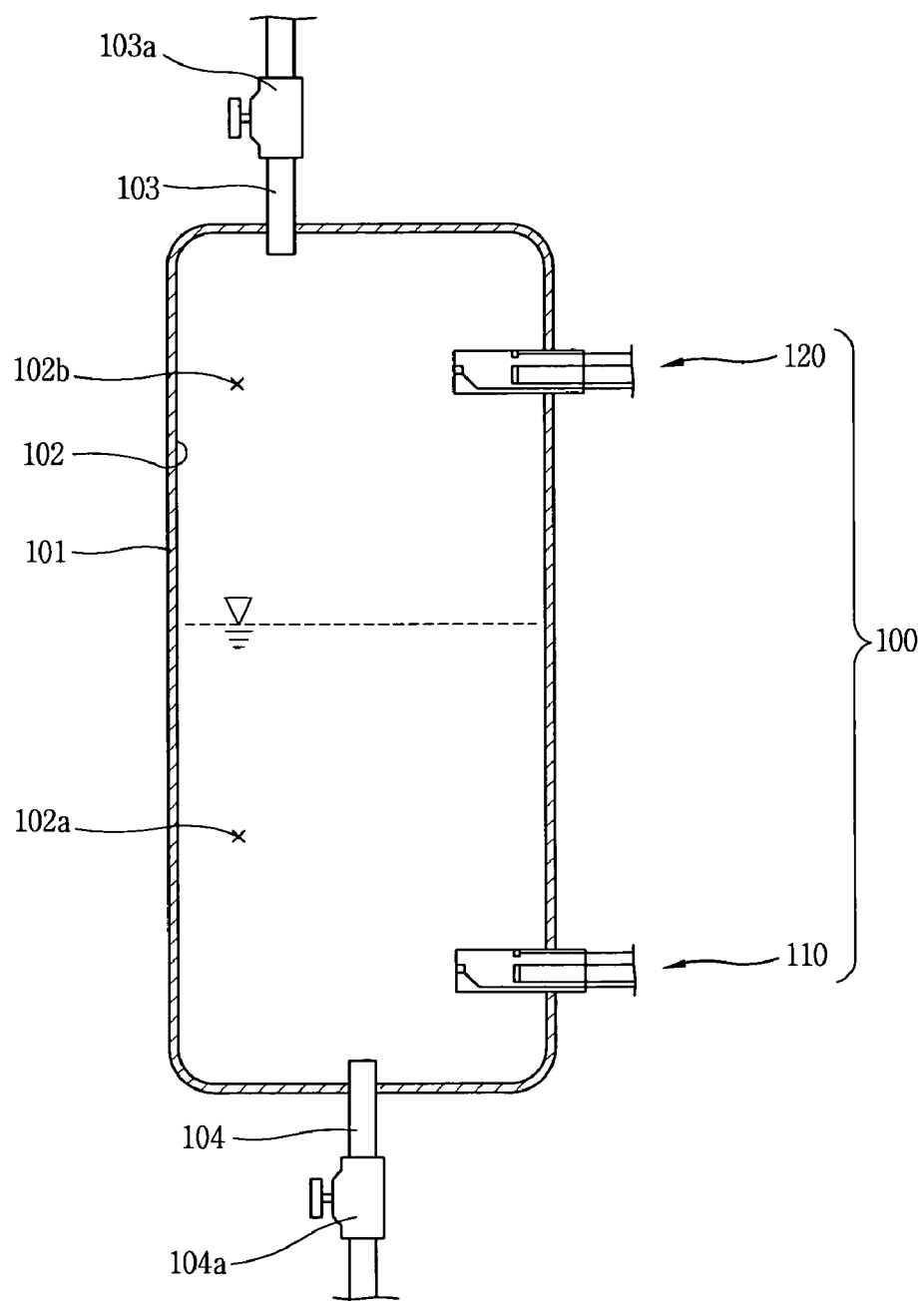
FIG. 2 is a longitudinal sectional view that illustrates the apparatus for controlling a refrigerant level in accordance with a first embodiment of the present invention.
Figure 3:
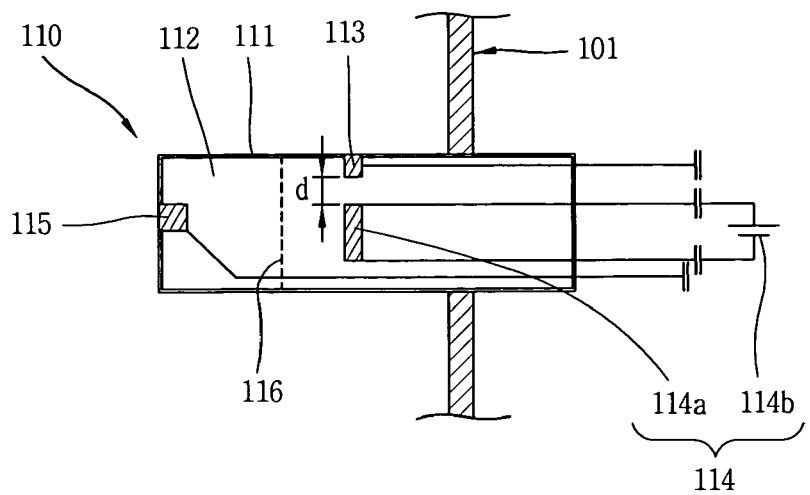
FIG. 3 is a longitudinal sectional view that illustrates a first detecting unit of the apparatus for controlling a refrigerant level in accordance with the first embodiment of the present invention.
Figure 4:
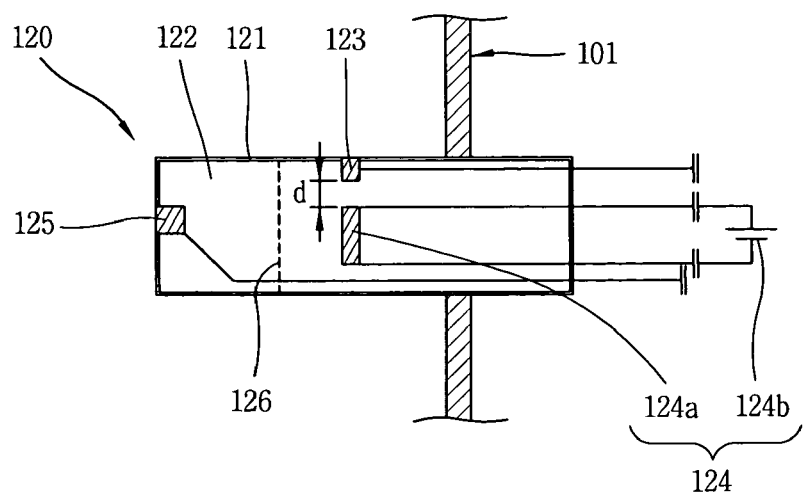
FIG. 4 is a longitudinal sectional view that illustrates a second detecting unit of the apparatus for controlling a refrigerant level in accordance with the first embodiment of the present invention.
Figure 5:
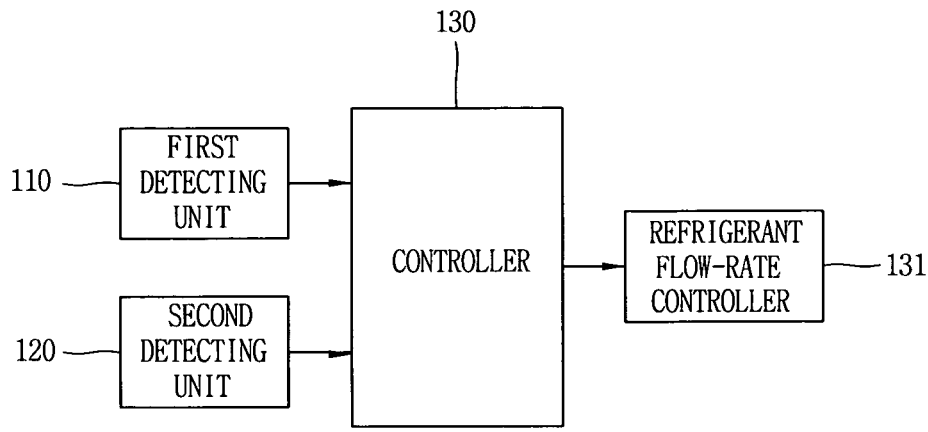
FIG. 5 is a flow chart that illustrates the operation of the apparatus for controlling a refrigerant level in accordance with the first embodiment of the present invention.
Figure 6:
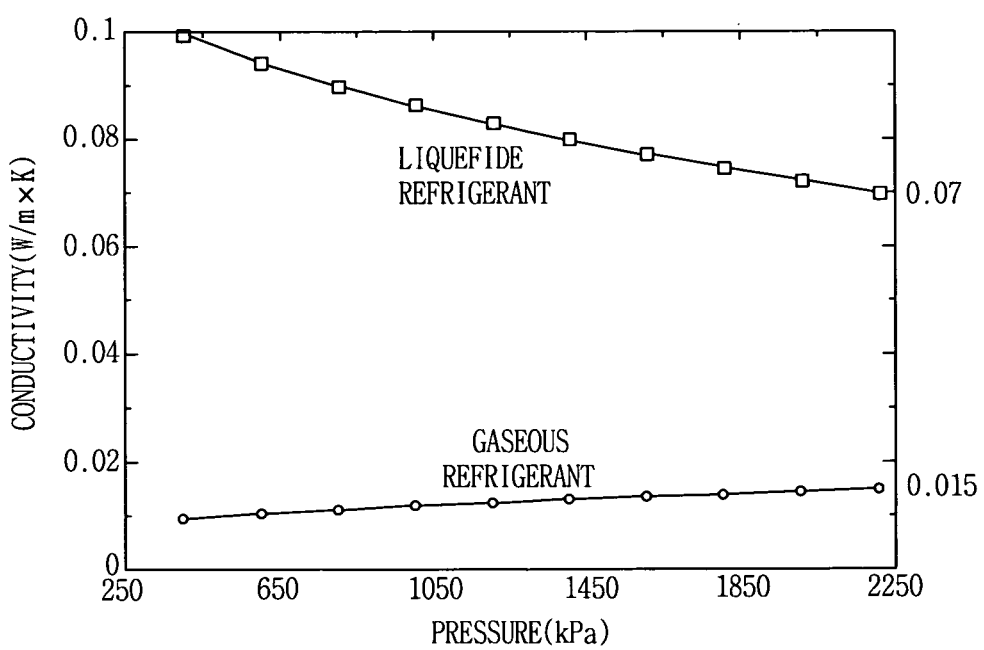
FIG. 6 is a graph that illustrates heat conductivity of a liquefied refrigerant and a gaseous refrigerant according to the pressure.
Figure 7:
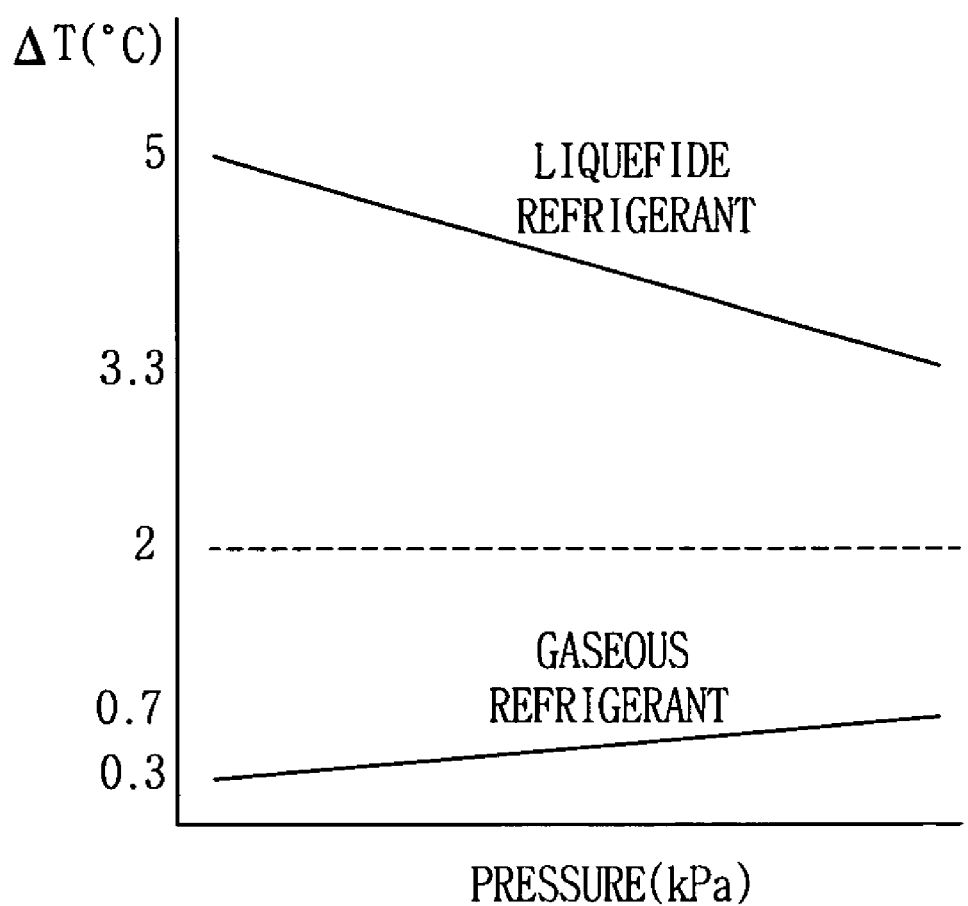
FIG. 7 is a graph that illustrates ΔT, which is a reference value of determining a liquefied refrigerant and a gaseous refrigerant.
Figure 8:
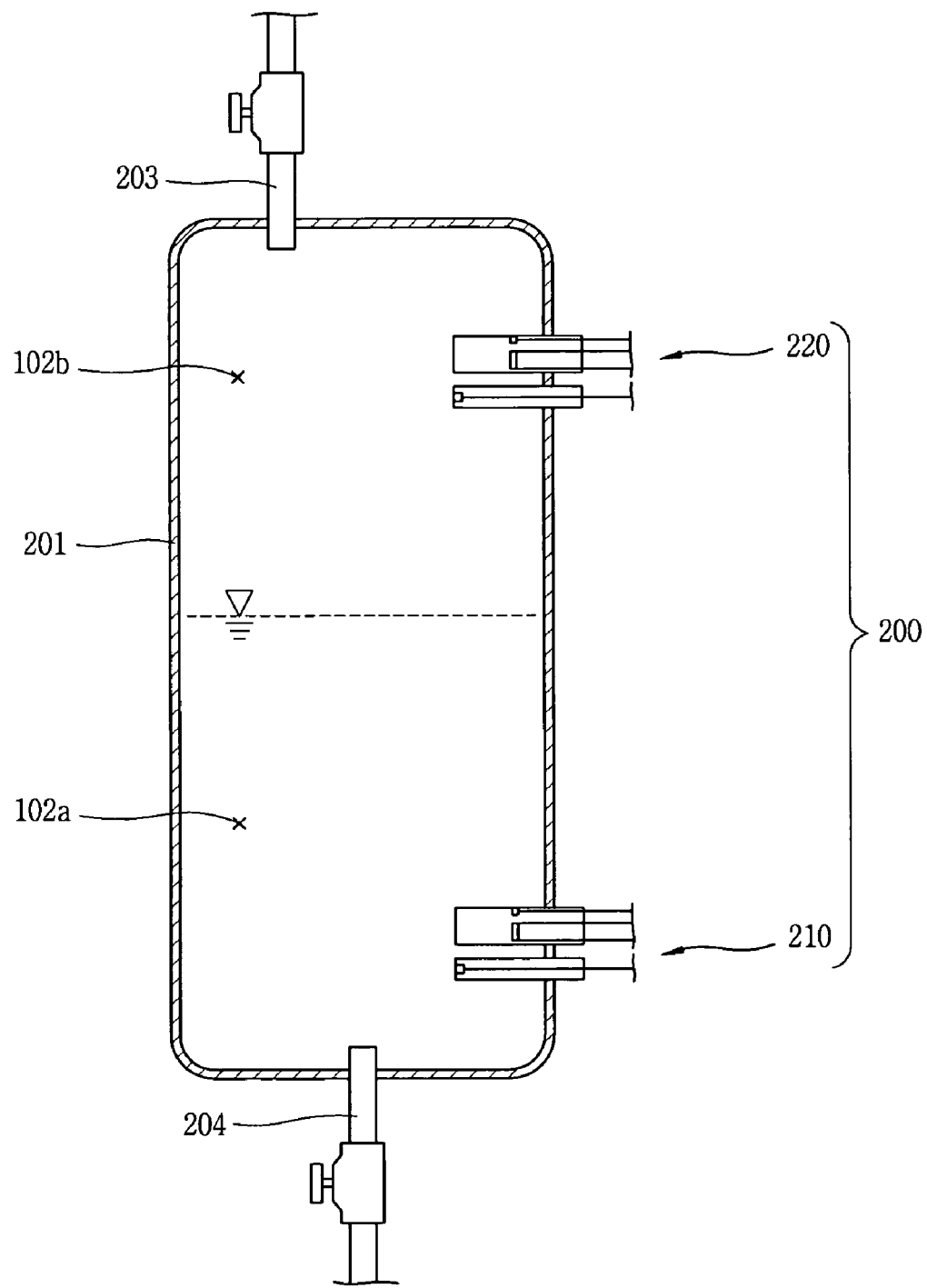
FIG. 8 is a longitudinal sectional view that illustrates an apparatus for controlling a refrigerant level in accordance with a second embodiment of the present invention.
Figure 9:
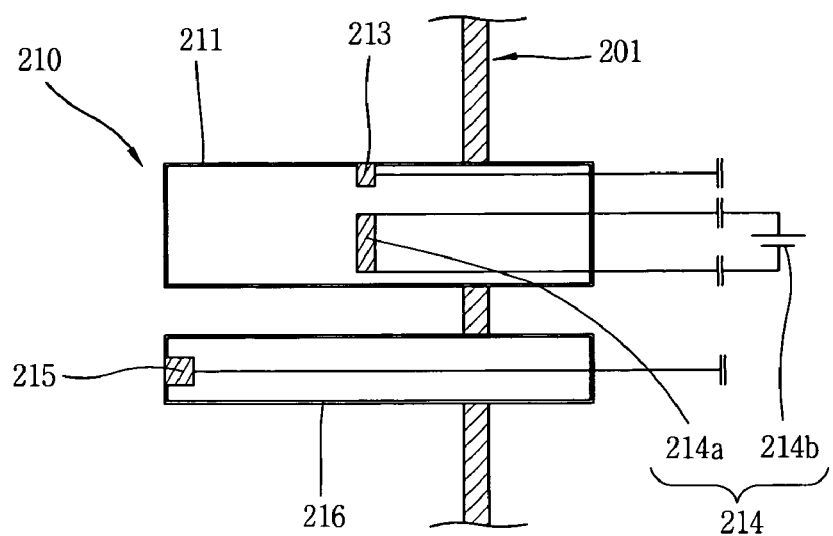
FIG. 9 is a longitudinal sectional view that illustrates a first detecting unit of the apparatus for controlling a refrigerant level in accordance with the second embodiment of the present invention.
Figure 10:
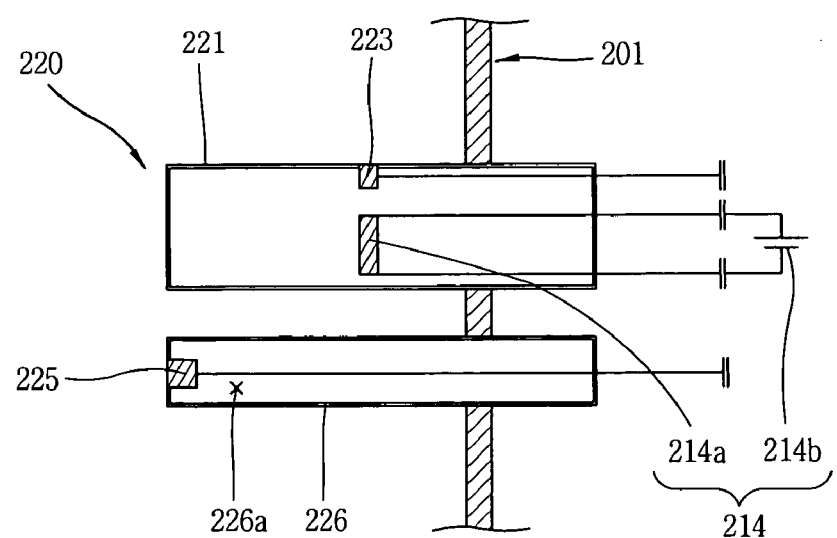
FIG. 10 is a longitudinal sectional view that illustrates a second detecting unit of the apparatus for controlling a refrigerant level in accordance with the second embodiment of the present invention.

FIG. 2 is a longitudinal sectional view that illustrates the apparatus for controlling a refrigerant level in accordance with the first embodiment of the present invention, FIG. 3 is a longitudinal sectional view that illustrates a first detecting unit of the apparatus for controlling a refrigerant level in accordance with the first embodiment of the present invention, FIG. 4 is a longitudinal sectional view that illustrates a second detecting unit of the apparatus for controlling a refrigerant level in accordance with the first embodiment of the present invention, FIG. 5 is a flow chart that illustrates the operation of the apparatus for controlling a refrigerant level in accordance with the first embodiment of the present invention, FIG. 6 is a graph that illustrates heat conductivity of a liquefied refrigerant and a gaseous refrigerant according to the pressure, and FIG. 7 is a graph that illustrates ΔT, which is a reference value of determining a liquefied refrigerant and a gaseous refrigerant.

As shown, the apparatus for controlling a refrigerant level in accordance with the first embodiment of the present invention includes: a first detecting unit 110 installed at a lower side of the inside of the refrigerant tank 101 so as to detect whether a refrigerant stored at a lower side of the inside of the refrigerant tank 101 is a liquefied refrigerant 102a or a gaseous refrigerant 102b by using a heat-conductivity difference between a liquefied refrigerant 102a and a gaseous refrigerant 102b stored in the refrigerant tank 101; a second detecting unit 120 installed at an upper side of the inside of the refrigerant tank 101 so as to detect whether a refrigerant stored at an upper side of the inside of the refrigerant tank 101 is a liquefied refrigerant 102a or a gaseous refrigerant 102b by using a heat-conductivity difference between a liquefied refrigerant 102a and a gaseous refrigerant 102b stored within the refrigerant tank 101; and a control unit 130 controlling inflow of the liquefied refrigerant 102a and the gaseous refrigerant 102b from an intake pipe 103 installed at an upper side of the refrigerant tank 101 upon determining a level of a liquefied refrigerant 102a according to a value measured by the first detecting unit 110 and the second detecting unit 120, and controlling discharge of the liquefied refrigerant 102a from a discharge pipe 104 installed at a lower side of the refrigerant tank 101.

The aforementioned first detecting unit 110 includes a first cell 111 installed at a lower side of the refrigerant tank 101 and having therein a space portion 112, a first cell inner-wall temperature sensor 113 installed at an inner wall of the first cell 111, for measuring a temperature of the first cell 111, a first heat generation portion 114 installed at the space portion 112 of the first cell 111 at an distance from the first cell inner-wall temperature, for transferring heat only to the first cell inner-wall temperature sensor 113, and a first refrigerant temperature sensor 115 installed at the space portion 112 of the first cell 111, for detecting a temperature of a refrigerant stored at the lower side of the inside of the refrigerant tank 101.

The first heat generation portion 114 includes a first heat generation body 114a installed at the space portion 112 of the first cell 111, and a first power 114b connected to the first heat generation body 114a.

Preferably, a heat blocking layer 116 of a heat-insulation material for decreasing heat transfer to the first refrigerant temperature sensor 115 from the first heat generation body 114a is installed between the first heat generation body 114a and the first refrigerant temperature sensor 115.

The aforementioned second detecting unit 120 includes a second cell 121 installed at a lower side of the refrigerant tank 10 and having therein a space portion 122, a second cell inner-wall temperature sensor 123 installed at an inner wall of the second cell 121, for measuring a temperature of the second cell 121, a second heat generation portion 124 installed at the space portion 122 of the second cell 121 at an distance from the second cell inner-wall temperature sensor 123, for transferring heat only to the second cell inner-wall temperature sensor 123, and a second refrigerant temperature sensor 125 installed at the space portion 122 of the second cell 121, for detecting a temperature of a refrigerant stored at a lower side of the inside of the refrigerant tank 101.

The second heat generation portion 124 includes a second heat generation body 124a installed at the space portion 122 of the second cell, and a second power 124b connected to the second heat generation body 124a.

Preferably, a heat blocking layer 126 of a heat insulation material for decreasing heat transfer from the second heat generation body 124a to the second refrigerant temperature sensor 125 is installed between the second heat generation body 124a and the second refrigerant temperature sensor 125.

Because the proper amount of liquefied refrigerant 102a should be stored within the refrigerant tank 101 all the time, the first detecting unit 110 is installed at a lower side of the inside of the refrigerant tank 101 and the second detecting unit 120 is installed at an upper side of the inside of the refrigerant tank 101 in order to detect a level of the liquefied refrigerant 102a by using a heat-conductivity difference between the liquefied refrigerant 102a and the gaseous refrigerant 102b.

Here, a "full" state of the inside of the refrigerant tank 101 refers to a state in which the refrigerant tank 101 is filled with a liquefied refrigerant 102a, and an "empty" state refers to a state in which the refrigerant tank 101 is filled with a gaseous refrigerant 102b after the liquefied refrigerant 102a is discharged.

When the first detecting unit 110 measures heat conductivity Kf and the second detecting unit 120 also measures heat conductivity Kf, the control unit 130 accurately determines the level of the liquefied refrigerant 102a within the refrigerant tank 101 based upon a value of the Kf measured by the first detecting unit 110 and a value of the Kf measured by the second detecting unit 120, and then, controls an intake valve 103a and a discharge valve 104a to allow the proper amount of liquefied refrigerant 1 02a to stay in the refrigerant tank 101 all the time.

Here, although the first detecting unit 110 and the second detecting unit 120 are placed at different positions, namely, at a lower portion and an upper portion of the refrigerant tank 101, respectively, they have the same construction.

The operation of the apparatus for controlling a level of a refrigerant in accordance with the first embodiment of the present invention will now be described.

As shown in FIG. 6, the heat conductivity of the liquefied refrigerant 102a according to the pressure is 5 to 10 times greater than that of the gaseous refrigerant 102b.

Also, the amount of heat (Q) supplied to the heat generation portion can be defined by the following equation with respect to the heat conductivity (Kf), a difference ($\Delta T$) between a cell-wall temperature (Tw) and a refrigerant temperature (Tf), an distance (d) between a cell-wall temperature sensor and a heat generation portion.

$$Q = Kf \times (Tw - Tf)/d \quad \text{(Equation)}$$

As described above, the method of determining a level of a refrigerant within the refrigerant tank may be divided into two methods in consideration of heat conductivity characteristics of the liquefied refrigerant 102a and the gaseous refrigerant 102b.

As for the first method, preset Q, (Tw−Tf) and d are substituted for those of the equation Q=Kf×(Tw−Tf)/d, to thereby obtain Kf of the first detecting unit 110 and Kf of the second detecting unit 120. Then, it is determined that the Kf obtained by the first detecting unit 110 and the Kf obtained by the second detecting unit 120 are the Kf of the liquefied refrigerant 102a or the Kf of the gaseous refrigerant 102b, and the control unit 130 selectively blocks or opens the intake valve 103a or the discharge valve 104a, such that the proper amount of refrigerant can stay within the refrigerant tank 101.

As for the second method, preset Q, (Tw−Tf) and d are substituted for those of the equation Q=Kf×(Tw−Tf)/d, to thereby obtain $\Delta T$ of the first detecting unit 110 and $\Delta T$ of the second detecting unit 120. Then, it is determined that $\Delta T$ obtained by the first detecting unit 110 and $\Delta T$ obtained by the second detecting unit 120 are $\Delta T$ of the liquefied refrigerant 102a or $\Delta T$ of the gaseous refrigerant 120b, and then the control unit 130 selectively blocks or opens the intake valve 103a or the discharge valve 104a, such that the proper amount of refrigerant can stay within the refrigerant tank 101.

The first method will now be described schematically.

As shown in FIG. 3, when power is applied to the first detecting unit 110 through the first power 114a, the first heat generation body 114b is heated.

Here, as given conditions, Q is 10 (W), and the distance "d" between the first cell wall temperature sensor 113 and the first heat generation body 114a is 0.005 m. Also (Tw−Tf)=$\Delta T$ can be measured by the first cell wall temperature sensor 113 and the first refrigerant temperature sensor 115. Thusly, if those data values are input to the equation Q=Kf×(Tw−Tf)/d, the value of Kf can be obtained.

If the measured value of Kf is 0.07~0.1 (W/m×k) as shown in FIG. 6, the refrigerant is determined to be a liquefied refrigerant, and if the value of Kf is 0.01~0.015 (W/m×k), the refrigerant is determined to be a gaseous refrigerant.

In the same manner as that of the first detecting unit 110, when power is applied to the second detecting unit 120 through the second power 124b, the first heat generation body 124a is heated.

Here, as given conditions, Q is 10 (W), and the distance "d" between the second cell wall temperature sensor 123 and the second heat generation body 124a is 0.005 (m). Also (Tw−Tf)=$\Delta T$ can be measured by the second cell wall temperature sensor 123 and the second refrigerant temperature sensor 125. Thusly, if those data values are input to the equation Q=Kf×(Tw−Tf)/d, the value of Kf can be obtained.

If the measured value of Kf is 0.07~0.1 (W/m×k) as shown in FIG. 6, the refrigerant is determined to be a liquefied refrigerant, and if the value of Kf is 0.01~0.015 (W/m×k), the refrigerant is determined to be a gaseous refrigerant.

The control unit 130 controls a refrigerant flow-rate controller such as a flow rate controller 131, to thereby allow the proper amount of refrigerant to stay within the refrigerant tank 101.

The second method will now be described schematically.

As shown in FIG. 6, the heat conductivity Kf of a liquefied refrigerant is 0.07~0.1 (W/m×k). Thus, those values are inputted to the equation above, such that, from 10 (W)=0.07~0.1 (W/m×k)×$\Delta T$ (° C.)/0.005 (m), $\Delta T$=0.5~0.7 (° C.) can be obtained.

Accordingly, if $\Delta T$ is 0.5~0.7 (° C.), currently, it can be seen that the liquefied refrigerant is staying at a current position of the refrigerant tank, namely, at a first detecting unit portion.

On the assumption that Q=10 (W) and d=0.005 (m), the heat conductivity Kf of a gaseous refrigerant is 0.01~0.015 (W/m×k). Upon inputting those values to the above-described equation, $\Delta T$=5~3.3 (° C.) can be obtained from 10 (W)=0.01~0.015 (W/m×k )×$\Delta T$ (° C.)/0.005 (m).

Accordingly, if $\Delta T$ is 5~3.3 (° C.), it can be seen that the gaseous refrigerant is staying at a current position of the refrigerant tank, namely, at a second detecting unit portion.

As shown in FIG. 7, because $\Delta T$ of the liquefied refrigerant and $\Delta T$ of the gaseous refrigerant are separated on the basis of $\Delta T$=2 (° C.), if $\Delta T$ measured by the first detecting unit 110 or the second detecting unit 120 is greater than 2 (° C.), it indicates that the gaseous refrigerant is stored at the current position, and if $\Delta T$ is smaller than 2 (° C.), it indicates that the liquefied refrigerant is stored at the current position.

TABLE 1

| case | ΔT of second detecting unit | ΔT of first detecting unit | Decision |
|---|---|---|---|
| 1$^{st}$ case | High | High | Empty |
| 2$^{nd}$ case | High | Low | Normal |
| 3$^{rd}$ case | Low | Low | Full |

In Table 1, "high" indicates the situation where ΔTs of the first detecting unit 110 and the second detecting unit 120 are greater than 2 (° C.), and "low" indicates the opposite situation.

Accordingly, as shown in the first case of Table 1, if ΔT measured by the second detecting unit 120 is greater than 2 (° C.) and ΔT measured by the first detecting unit 110 is greater than 2 (° C.), it indicates that the refrigerant tank 101 is in a state that it is filled with the gaseous refrigerant, namely, in the "empty" state.

As shown in the second case of Table 1, if ΔT measured by the second detecting unit 120 is greater than 2 (° C.) and ΔT measured by the first detecting unit 110 is smaller than 2 (° C.), it indicates that the refrigerant tank 101 is in a state that the proper amount of liquefied refrigerant exists, namely, that it is in the "normal" state.

Finally, as shown in the third case of Table 1, if ΔT measured by the second detecting unit 120 is smaller than 2 (° C.) and ΔT measured by the first detecting unit 110 is smaller than 2 (° C.), it indicates that the refrigerant tank 101 is in a state that it is filled with the liquefied refrigerant, namely, in the "full" state.

Accordingly, when the refrigerant tank 101 is in the "empty" state, the control unit 130 minimizes the flow rate of refrigerant through a refrigerant flow rate controller 131 such as a pump flow rate controller. When the refrigerant tank 101 is in the "full" state, the flow rate of the refrigerant is maximized through the refrigerant flow rate controller (not shown). In such a manner, the control unit 130 allows the proper amount of liquefied refrigerant 102a to stay in the refrigerant tank 101.

The apparatus for controlling a refrigerant level in accordance with the second embodiment of the present invention will now be described with reference to accompanying drawings.

The apparatus 200 for controlling a refrigerant level in accordance with the second embodiment includes a first detecting unit 210 installed at a lower side of the inside of the refrigerant 201 so as to detect whether a refrigerant stored at a lower side of the inside of the refrigerant tank 201 is a liquefied refrigerant 102a or a gaseous refrigerant 102b by using a heat conductivity difference between a liquefied refrigerant 102a and a gaseous refrigerant 102b stored within the refrigerant tank 201, a second detecting unit 220 installed at an upper side of the inside of the refrigerant tank 201 so as to detect whether a refrigerant stored at an upper side of the inside of the refrigerant tank 201 is a liquefied refrigerant 102a or a gaseous refrigerant 102b by using a heat conductivity difference between the liquefied refrigerant 102a and the gaseous refrigerant 102b stored within the refrigerant tank, and a control unit 230 controlling inflow of a liquefied refrigerant 102a and a gaseous refrigerant 102b from an intake pipe 203 installed at an upper side of the refrigerant tank 201 upon determining a level of the liquefied refrigerant according to values measured by the first detecting unit 210 and the second detecting unit 220, and controlling discharge of the liquefied refrigerant 102a from a discharge pipe 204 installed at a lower side of the refrigerant tank 201.

The first detecting unit 210 includes a first cell 211 installed at a lower side of the refrigerant tank 201 and having therein a space portion 212, a first cell inner-wall temperature sensor 213 installed at an inner wall of the first cell 211, for measuring a temperature of the first cell 211, a first heat generation portion 214 installed at the space portion 212 of the first cell at an distance from the first cell inner-wall temperature sensor 213, for transferring heat only to the first cell inner-wall temperature sensor 213, a first auxiliary cell 216 installed at a lower portion of the first cell 211 and having therein a space portion 212, and a first refrigerant temperature sensor 215 installed at the space portion 212 of the first auxiliary cell 216, for detecting a temperature of a refrigerant stored at a lower side of the inside of the refrigerant tank 201.

The first heat generation portion 214 includes a first heat generation body 214a installed at the space portion 212 of the first cell 211, and a first power 214b connected to the first heat generation body 214a.

The second detecting unit 220 includes a second cell 221 installed at a lower side of the refrigerant tank 201 and having therein a space portion 222, a second cell inner-wall temperature sensor 223 installed at an inner wall of the second cell 211, for measuring a temperature of the second cell 221, a second heat generation portion 224 installed at the space portion 222 of the second cell 221 at an distance from the second cell inner-wall temperature sensor 223, for transferring heat only to the second cell inner-wall temperature sensor 223, a second auxiliary cell 226 installed at a lower portion of the second cell 221 and having therein a space portion 226a, and a second refrigerant temperature sensor 225 installed at the space portion 226a of the second auxiliary cell 226, for detecting a temperature of a refrigerant stored at a lower side of the inside of the refrigerant tank 201.

The apparatus for controlling a refrigerant level in accordance with the second embodiment of the present invention constructed in the aforementioned manner has the same structure as that of the apparatus for controlling a refrigerant level in accordance with the first embodiment, except that the second refrigerant temperature sensor 225 is installed at the space portion 226a of the second auxiliary cell 226.

Figure 11:
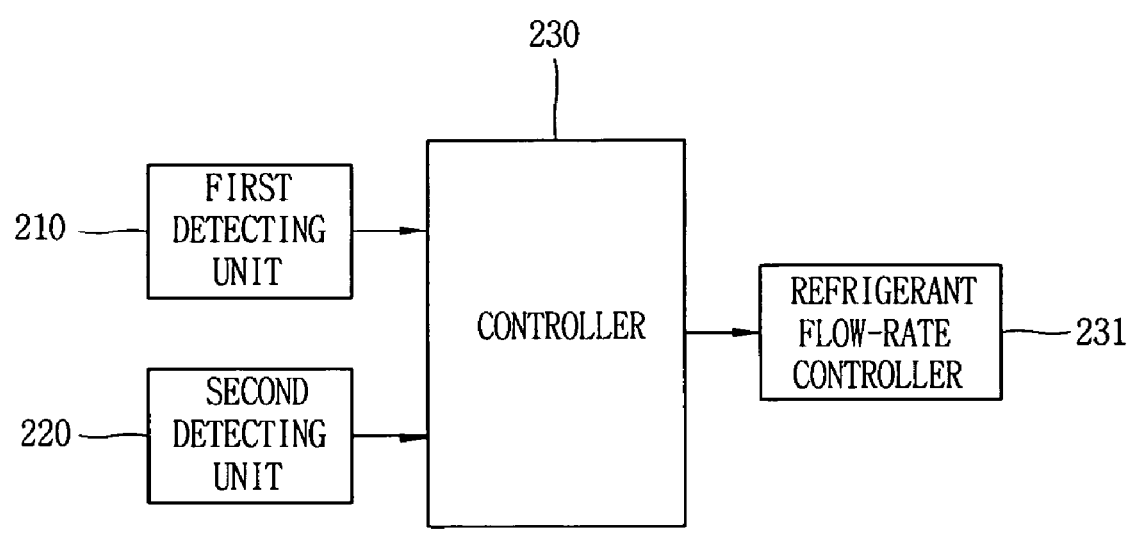
FIG. 11 is a flow chart that illustrates the operation of the apparatus for controlling a refrigerant level in accordance with the second embodiment of the present invention.

Also, as shown in FIG. 11, as for the operational effect of the apparatus for controlling a refrigerant level in accordance with the second embodiment of the present invention, with the same principle as that of the apparatus for controlling a refrigerant level in accordance with the first embodiment of the present invention, the control unit 230 determines measured values detected by the first detecting unit 210 and the second detecting unit 220 and controls a refrigerant flow rate controller 231, thereby allowing the proper amount of refrigerant to stay within the refrigerant tank 201.

As described so far, the apparatus for controlling a refrigerant level in accordance with the present invention achieves simplicity in structure, economical efficiency, reliability in operation and durability of a product.

Also, by using a heat conductivity difference between a liquefied refrigerant and a gaseous refrigerant, a level of a liquefied refrigerant within a refrigerant tank can be easily and quickly determined and the reliability of a product can be secured.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for controlling a refrigerant level, the apparatus comprising:
   a first detecting unit that is installed at a lower side of the inside of the refrigerant tank, and includes a first cell inner-wall temperature sensor for measuring a temperature of the inside of the refrigerant tank and a first heat generation portion for transferring heat to the first cell inner-wall temperature sensor; a second detecting unit that is installed at an upper side of the inside of the refrigerant tank, and includes a second cell inner-wall temperature sensor for measuring a temperature of the inside of the refrigerant tank and a second heat generation portion for transferring heat to the second cell inner-wall temperature sensor; and
   a control unit controlling a refrigerant within the refrigerant tank according to a value measured by the first and second detecting units.

2. The apparatus of claim 1, wherein the control unit controls a refrigerant flow-rate controller according to values measured by the first detecting unit and the second detecting unit, to thereby allow the proper amount of refrigerant to stay within the refrigerant tank.

3. The apparatus of claim 1, wherein the first detecting unit comprises:
   a first cell installed at a lower side of the refrigerant tank and having therein a space portion; and
   a first refrigerant temperature sensor installed at the space portion of the first cell, for detecting a temperature of a refrigerant stored at a lower side of the inside of the refrigerant tank,
   wherein the first cell inner-wall temperature sensor is installed at an inner wall of the first cell, and measures a temperature of the first cell, and
   wherein the first heat generation portion is installed at the space portion of the first cell at an interval from the first cell inner-wall temperature sensor, and transfers heat only to the first cell inner-wall temperature sensor.

4. The apparatus of claim 3, wherein the first heat generation portion comprises:
   a first heat generation body installed at the space portion of the first cell; and
   a first power connected to the first heat generation body.

5. The apparatus of claim 3, wherein a heat blocking layer of a heat insulation material for decreasing heat transfer from the first heat generation body to the first refrigerant temperature sensor is installed between the first heat generation body and the first refrigerant temperature sensor.

6. The apparatus of claim 1, wherein the second detecting unit comprises:
   a second cell installed at an upper side of the refrigerant tank and having therein a space portion; and
   a second refrigerant temperature sensor installed at the space portion of the second cell, for detecting a temperature of a refrigerant stored at a lower side of the inside of the refrigerant tank,
   wherein the second cell inner-wall temperature sensor is installed at an inner-wall of the second cell, and measures a temperature of the second cell, and
   wherein the second heat generation portion is installed at the space portion of the second cell at an interval from the second cell inner-wall temperature sensor, and transfers heat only to second cell inner-wall temperature sensor.

7. The apparatus of claim 6, wherein the second heat generation portion comprises:
   a second heat generation body installed at the space portion of the second cell; and
   a second power connected to the second heat generation body.

8. The apparatus of claim 6, wherein a heat blocking layer of a heat insulation material for decreasing heat transfer from the second heat generation body to the second refrigerant temperature sensor is installed between the second heat generation body and the second refrigerant temperature sensor.

9. An apparatus for controlling a refrigerant level, the apparatus comprising:
   a first detecting unit installed at a lower side of the inside of the refrigerant tank, for detecting whether a refrigerant stored at a lower side of the inside of the refrigerant tank is a liquefied refrigerant or a gaseous refrigerant;
   wherein the first detecting unit comprises:
      a first cell having a space portion and a first cell inner-wall temperature sensor for measuring a temperature of the first cell; and
      a first auxiliary cell installed at a lower portion of the first cell with a space portion and a first refrigerant temperature sensor for detecting a temperature of a refrigerant;
   a second detecting unit installed at an upper side of the inside of the refrigerant tank, for detecting whether a refrigerant stored at an upper side of the inside of the refrigerant tank is a liquefied refrigerant or a gaseous refrigerant; and
   a control unit controlling a refrigerant flow-rate controller according to values measured by the first detecting unit and the second detecting unit, to thereby allow the proper amount of refrigerant to stay within the refrigerant tank.

10. The apparatus of claim 9, wherein the first detecting unit further comprises:
    a first heat generation portion installed at the space portion of the first cell at an interval from the first cell inner-wall temperature sensor, for transferring heat only to the first cell inner-wall temperature sensor; and
    a first refrigerant temperature sensor installed at the space portion of the first auxiliary cell, for detecting a temperature of a refrigerant stored at a lower side of the inside of the refrigerant tank.

11. The apparatus of claim 10, wherein the first heat generation portion comprises:
    a first heat generation body installed at the space portion of the first cell; and
    a first power connected to the first heat generation body.

12. The apparatus of claim 10, wherein the second detecting unit comprises:
    a second cell installed at a lower side of the refrigerant tank and having therein a space portion;
    a second cell inner-wall temperature sensor installed at an inner wall of the second cell, for measuring a temperature of the second cell;
    a second heat generation portion installed at the space portion of the second cell at an distance from the second cell inner-wall temperature sensor, for transferring heat only to the second cell inner-wall temperature sensor;
    a second auxiliary cell installed at a lower portion of the second cell and having therein a space portion; and a second refrigerant temperature sensor installed at the space portion of the second auxiliary cell, for detecting a temperature of a refrigerant stored at a lower side of the inside of the refrigerant tank.

13. An apparatus for controlling a refrigerant level, the apparatus comprising:
   a first detecting unit installed at a lower side of the inside of a refrigerant tank, for detecting whether a refrigerant stored at a lower side of the inside of the refrigerant tank is a liquefied refrigerant or a gaseous refrigerant by using a heat conductivity difference between a liquefied refrigerant and a gaseous refrigerant stored within the refrigerant tank;
   a second detecting unit installed at an upper side of the inside of the refrigerant tank, for detecting whether a refrigerant stored at an upper side of the inside of the refrigerant tank is a liquefied refrigerant or a gaseous refrigerant by using a heat conductivity difference between a liquefied refrigerant and a gaseous refrigerant stored within the refrigerant tank; and
   a control unit controlling a refrigerant flow-rate controller according to values measured by the first detecting unit and the second detecting unit to thereby allow the proper amount of refrigerant to stay within the refrigerant tank, wherein the first detecting unit comprises:
      a first cell installed at a lower side of the refrigerant tank and having therein a space portion; and
      a first cell inner-wall temperature sensor installed at an inner wall of the first cell, for measuring a temperature of the first cell.

14. The apparatus of claim 13, wherein the first detecting unit further comprises:
   a first heat generation portion installed at the space portion of the first cell at an distance from the first cell inner-wall temperature sensor, for transferring heat only to the first cell inner-wall temperature sensor; and
   a first refrigerant temperature sensor installed at the space portion of the first cell, for detecting a temperature of a refrigerant stored at a lower side of the inside of the refrigerant tank.

15. The apparatus of claim 14, wherein the first heat generation portion comprises:
   a first heat generation body installed at the space portion of the first cell; and
   a first power connected to the first heat generation body.

16. The apparatus of claim 13, wherein the second detecting unit comprises:
   a second cell installed at a lower side of the refrigerant tank and having therein a space portion;
   a second cell inner-wall temperature sensor installed at an inner wall of the second cell, for measuring a temperature of the second cell;
   a second heat generation portion installed at the space portion of the second cell at an distance from the second cell inner-wall temperature sensor, for transferring heat only to the second cell inner-wall temperature sensor; and
   a second refrigerant temperature sensor installed at the space portion of the second cell, for detecting a temperature of a refrigerant stored at a lower side of the inside of the refrigerant tank.

17. The apparatus of claim 16, wherein the second heat generation portion comprises:
   a second heat generation body installed at the space portion of the second cell; and
   a second power connected to the second heat generation body.

18. The apparatus of claim 13, wherein the first detecting unit further comprises:
   a first heat generation portion installed at the space portion of the first cell at an distance from the first cell inner-wall temperature sensor, for transferring heat only to the first cell inner-wall temperature sensor;
   a first auxiliary cell installed at a lower portion of the first cell and having therein a space portion; and
   a first refrigerant temperature sensor installed at the space portion of the first auxiliary cell, for detecting a temperature of a refrigerant stored at a lower side of the inside of the refrigerant tank.

19. The apparatus of claim 18, wherein the first heat generation portion comprises:
   a first heat generation body installed at the space portion of the first cell; and
   a first power connected to the first heat generation body.

20. The apparatus of claim 13, wherein the second detecting unit comprises:
   a second cell installed at a lower side of the refrigerant tank and having therein a space portion;
   a second cell inner-wall temperature sensor installed at an inner wall of the second cell, for measuring a temperature of the second cell;
   a second heat generation portion installed at the space portion of the second cell at an distance from the second cell inner-wall temperature sensor, for transferring heat only to the second cell inner-wall temperature sensor;
   a second auxiliary cell installed at a lower portion of the second cell and having therein a space portion; and
   a second refrigerant temperature sensor installed at the space portion of the second auxiliary cell, for detecting a temperature of a refrigerant stored at a lower side of the inside of the refrigerant tank.

* * * * *